United States Patent [19]

Hackman

[11] 3,814,379

[45] June 4, 1974

[54] ROTARY VALVE WITH ANTI-CORROSION AND TORQUE CONTROLLING MEANS

[75] Inventor: Frank C. Hackman, Decatur, Ill.

[73] Assignee: Mueller Co., Decatur, Ill.

[22] Filed: July 6, 1972

[21] Appl. No.: 269,294

[52] U.S. Cl. .............................................. 251/297
[51] Int. Cl. ............................................. F16k 31/00
[58] Field of Search ...... 277/32, 205, 206; 251/172, 251/214, 297, 308, 309, 315, 317, 312

[56] References Cited
UNITED STATES PATENTS

| | | | |
|---|---|---|---|
| 2,509,436 | 5/1950 | Isenbarger | 277/205 X |
| 2,907,596 | 10/1959 | Maha | 277/205 |
| 2,997,318 | 8/1961 | Lansky et al. | 277/205 X |
| 3,175,833 | 3/1965 | Morse | 277/205 |
| 3,190,702 | 6/1965 | Flick | 277/205 X |
| 3,305,211 | 2/1967 | Phillips | 251/309 |
| 3,350,057 | 10/1967 | Luckenbill | 251/312 |
| 3,384,337 | 5/1968 | Brown | 251/315 X |
| 3,471,121 | 10/1969 | Geiselman | 251/308 |
| 3,501,157 | 3/1970 | Doutt | 277/205 X |
| 3,602,340 | 8/1971 | Budzich | 251/214 X |

*Primary Examiner*—Henry T. Klinksiek
*Attorney, Agent, or Firm*—Cushman, Darby & Cushman

[57] ABSTRACT

A rotary valve assembly of the "soft seat" type for use in fluid distribution systems such as gas or water. The valve assembly includes a valve housing having a fluid passage therethrough and a rotary valve structure including a valve operating member or stem extending exteriorly of the housing and a valve member for cooperating with valve seat means in the flow passage. Means are provided between the valve stem and the wall of the bore through which the valve stem extends for applying a controlled torque sufficient to render the valve structure inoperative by hand. Additionally, the torque controlling means prevents ingress of fluid or abrasive material to the interior of the valve assembly and also prevents corrosion between the valve stem and valve housing.

8 Claims, 4 Drawing Figures

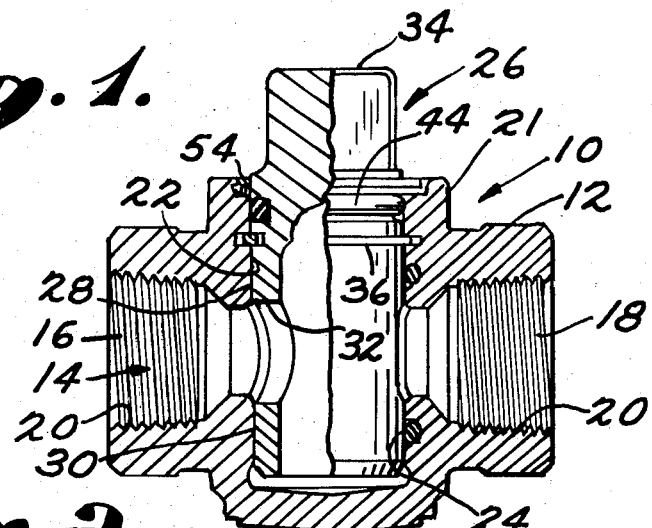
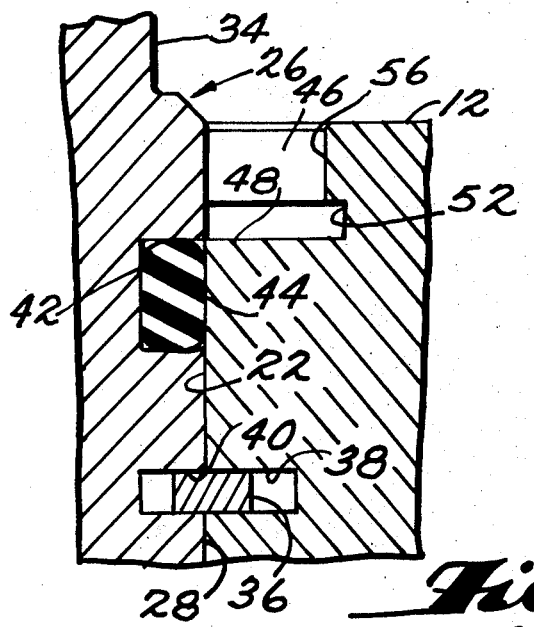
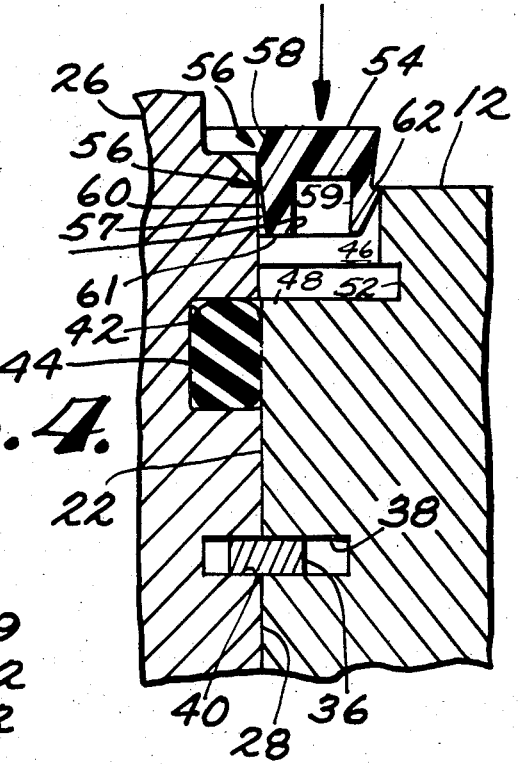
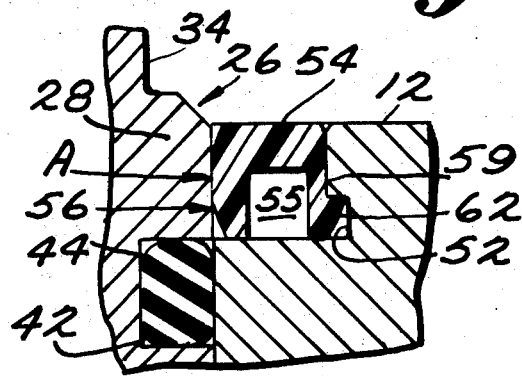

ROTARY VALVE WITH ANTI-CORROSION AND TORQUE CONTROLLING MEANS

The present invention is an improvement in rotary valves of the type disclosed in the co-pending United States application of Wilbur R. Leopold, Jr. and William L. Hauffe, Ser. No. 269,295 filed concurrently herewith and entitled "Rotary Valve With Anti-Corrosion and Torque Controlling Means".

The present invention relates generally to improvements in rotary valves of the type used in fluid distribution systems where it is desirous the valve cannot be operated by people without the use of a tool. Valve assemblies of the type contemplated in the present invention are commonly used in supply lines for commercial or domestic gas or for water, the same being connected into the line ahead of the meter.

BACKGROUND OF THE INVENTION

In the past, valve assemblies used in fluid distribution systems, such as gas and water, have been of the type known as "ground key" stops. In this type of valve assembly, the valve housing is provided with a flow passage therethrough having a valve seat intermediate the inlet and outlet of the flow passage and a bore communicating with the valve seat from the exterior of the housing. The valve member which was commonly referred to as a key was usually in the shape of a plug and it was ground to fit the particular valve seat in a particular housing. The "ground key" type of rotary valve assembly which complies with standards for sealing cannot be operated by hand but requires the use of a wrench or other tool to overcome starting torque and then turning torque. For example, a ¾ inch valve assembly usually has a starting or breakaway torque in the range of 250 to 500 inch-pounds and a turning torque in the range of 125 to 250 inch-pounds. Other size valve assemblies of the "ground key" type both smaller and larger have starting and turning torque ranges too high for operation by hand. There was never any problem of children or for that matter of unauthorized adults operating these valves unless they actually had a tool. The gas companies insist upon such an arrangement so as to avoid improper operation of the valves and thus eliminate as much as possible dangerous situations, such as unauthorized persons turning the valve off and then turning it on without relighting of pilot lights.

In recent years efforts have been made to design other types of valve assemblies for use in fluid distribution systems which could meet the standards set by the industry for positive sealing capacity throughout the expected operating range of temperatures, longevity and the like. In this respect, the efforts by the manufacturers have been to get away from the operation of grinding the valve member to fit a particular valve seat and the results have been the invention of what is known in the industry as a "soft seated" valve. These "soft seated" rotary valves have in most instances been a plug type of valve with an O-ring seal carried on the plug or carried in the valve housing and surrounding either the inlet or outlet of the flow passage. Other types of "soft seated" rotary valves have been the type utilizing a ball cooperating with annular seats between the ball and the flow passage in the housing. A third type of soft seated valve has been the type wherein a cylindrical roller made of a resilient material is carried on a valve operating element and adapted to cooperate with the port or ports of the flow passage through the valve housing.

The above described "soft seated" rotary valves, while capable of meeting the standards set by the fluid distribution industry with regard to sealing pressures, longevity and the like have had one disadvantage, namely, they have been too easy to operate and, in fact, can be operated by hand. Because of this disadvantage, "soft seated" valves have not been overwhelmingly accepted by the gas and water industry even though these valves are inexpensive to manufacture. These valves with low torque characteristics can only be used in a controlled situation where it is impossible for unauthorized personnel to get to them.

Prior art arrangements of "soft seated" rotary valves and of valves which are related to the present invention may be found in the following patents.

| NUMBER | NAME | DATE |
|---|---|---|
| 3,343,803 | Burke | Sept. 26, 1967 |
| 3,350,057 | Luckenbill | Oct. 31, 1967 |
| 3,437,106 | Mueller et al. | Apr. 8, 1969 |
| 3,563,512 | Hauffe | Feb. 16, 1971 |

BRIEF SUMMARY OF THE INVENTION

The present invention relates to rotary valve assemblies comprising a valve housing having a flow passage therethrough with a chamber intermediate the ends of the flow passage, the chamber providing a valve seat means and communicating with a bore open to the exterior; and a valve structure including a valve stem rotatable in the bore and a valve member cooperating with valve seat means in the chamber. The valve assembly is of the "soft seated" type of valve which requires very little torque to operate. The present invention in more detail relates to means for applying a controlled torque to the valve stem which is sufficient to prevent the valve assembly from being opened or closed by hand. In other words, the break-loose torque and turning torque applied by the torque controlling means is at least great enough to require the use of a wrench or other tool to operate the valve assembly.

Normally ¾ inch "soft seated" type of rotary valves have a breakloose torque of only 10 to 15 inch-pounds and a turning torque in the order of 5 inch-pounds. Such a valve assembly can be operated by hand and this feature is very undesirable when the valve assemblies are used in fluid distribution systems wherein the fluid used may be dangerous if not properly controlled. It has been found that the breakloose torque in a "soft seated" valve assembly must be raised considerably above the aforementioned values so that the valve cannot be operated by hand. Consequently, it is the object of the present invention to provide a controlled torque in a rotary valve assembly which is substantially less than the torque required to operate a ground key rotary valve assembly but still high enough to prevent operation of the valve assembly without the use of a wrench or other tool.

The means for controlling the torque in the valve assembly of the present invention also functions to prevent moisture and/or foreign matter from entering the area between the stem and the body as well as functioning to prevent corrosion from a bridging between the valve stem and valve housing.

The torque controlling means comprises an annular ring made of a resilient, yieldable material and positioned in a groove between the valve stem and the valve housing at the outer end of the valve stem bore. The annular ring is specifically dimensioned with respect to the groove between the wall of the bore in the valve housing so as to provide the increase in torque to the desired amount and it is positioned outwardly of the conventional sealing means between the valve stem and housing and thus protects the sealing means from foreign matter and prevents corrosion between the valve stem and valve housing.

In the aforementioned Leopold et al. application Ser. No. 269,295, the annular torque controlling ring was solid in radial section. Consequently the ring was installed in the groove in the valve housing or body prior to the installation of the valve structure i.e. the valve stem and valve member. In some instances, the valve structure, when sliding through the ring, damaged the ring thus affecting its function. The present invention obviates this as the ring is inserted after assembly of the valve and this can be accomplished as the ring is provided with an annular groove to define a pair of legs which can flex slightly upon installation.

DETAILED DESCRIPTION OF THE DRAWINGS

FIG. 1 is a vertical sectional view of a rotary valve assembly embodying the present invention, the view showing the valve structure, namely the plug partly in elevation;

FIG. 2 is an enlarged fragmentary sectional view of the valve structure, namely the plug in position in the valve housing or body prior to insertion of the torque controlling ring;

FIG. 3 is an enlarged fragmentary sectional view similar to FIG. 2 but illustrating the torque controlling ring being inserted downwardly into the assembled valve structure and valve housing; and FIG. 4 is an enlarged fragmentary sectional view illustrating the torque controlling ring in assembled position.

DETAILED DESCRIPTION OF THE INVENTION

Referring now to the drawings, wherein like character or reference numerals represent like or similar parts and in particular to FIGS. 1 and 2 inclusive, there is shown a rotary valve assembly generally designated at 10 and having a valve housing member or body 12 with a flow passage 14 therethrough. One end of the flow passage 14 defines an inlet end portion 16 for the valve assembly, whereas the other end of the flow passage 14 defines an outlet end portion 18. The inlet and outlet end portions 16 and 18 are respectively threaded as indicated at 20 for receiving the threaded ends of fluid lines (not shown). The valve housing member 12 is provided with a generally cylindrical extension 21 through which extends a bore 22, the bore opening to the flow passage 14 intermediate the inlet and outlet end portions 16 and 18, respectively. At the portion where the bore opens to the flow passage it will be defined for the purpose of this description as a chamber providing a valve seat 24 in the form of an O-ring surrounding at least one of the ports of the inlet and outlet end portions 16 and 18.

Inserted into the bore 22 is a unitary valve structure 26 of the plug type and having a stem portion 28 and a valve member portion 30 with the flow-way 32 therethrough. A flattened noncircular head 34 of the valve stem portion 28 extends outwardly of the valve housing member 12 and is capable of receiving a wrench in order to turn or rotate the valve structure to open and close the flow passage 14 in valve housing member 12.

The valve assembly 10 briefly described above and which utilizes the present invention, is disclosed in detail in the aforementioned U.S. Pat. No. 3,563,512 and is one type of "soft seated" rotary valve assembly to which the present invention may be incorporated. Other types of "soft seated" rotary valve assemblies are disclosed in detail in the aforementioned U.S. Pat. Nos. 3,343,803, 3,350,057 and 3,437,106 and in the copending United States application Ser. No. 32,708, filed Apr. 27, 1970 by Hauffe et al. and entitled "Soft Seated Rotary Valve" and new U. S. Pat. No. 3,684,242 issued August 15, 1972. Also, it is within the scope of the present invention to utilize the same with valves other than "soft seated" valves such as "butterfly" type valves, eccentric plug valves and the like.

As shown in FIGS. 1 and 2, the unitary valve structure 26 i.e. the valve stem 28 and valve member 30, is retained in the valve housing member 12 by means of a split snapring 36 carried in matching annular grooves 38 and 40 provided in the valve housing member 12 and the valve stem 28 respectively. The valve stem 28 is provided with another annular groove 42 in which is positioned an O-ring seal 44 for sealing the interior of the valve assembly 10 from the exterior.

In the open upper end of the bore 22 there is provided an annular groove 46, the groove 46 having an outwardly facing wall 48 and a second wall 50 coaxial with respect to the bore 22. The second coaxial wall 50 is undercut at its inner end as indicated at 52 by an annular counter-bore.

An annular torque controlling ring 54 made of a resilient, yieldable material is positioned in the groove 46 as shown in FIG. 4. In more detail the torque controlling ring 54 has an inner peripheral wall 56 defined by two wall portions 58 and 60 at least one of which diverges outwardly away from the axis of the ring 54. The relaxed radial thickness of the ring 54, at least at the point where the wall portions 58 and 60 join each other, is greater than the radial thickness of the groove 46 and thus, when the ring 54 is assembled in the valve housing member 12 with the valve structure 26 in place, the ring 54 will deform in the area marked A in FIG. 4 and will apply a friction on the valve stem 28 to produce the necessary torque to make the valve assembly 10 operable only by the use of a tool.

The annular torque controlling ring of the rotary valve assembly in the aforementioned Leopold et al application Ser. No. 269,295 is substantially solid in radial section. Because of this, the ring must be inserted into the groove in the valve housing or body prior to the insertion of the valve structure such as the valve plug or member and valve stem. Oftentimes such an arrangement resulted in damage to the torque controlling ring upon passage of the valve structure therethrough including the split lock ring carried thereby. The torque controlling ring 54 of the present invention enables the valve housing 12 and valve structure 26 to be assembled in permanent relationship to one another prior to the insertion of the torque controlling ring for applying the controlled torque on the valve stem 28. This is accomplished by providing the inner radial wall 61 with an annular groove 55, thus defining a pair of annular legs 57 and 59 respectively.

The leg 59 is provided with stop means 62 which may be an annular, radially extending lip on its lower edge which tapers inwardly and downwardly and thus is frustoconical in shape or which may be a plurality of arcuate circumferentially spaced lips or protrusions. When the valve assembly 10, that is the valve housing and the valve structure 26, has been assembled without the torque controlling ring 54, the valve assembly requires very little torque to operate and thus can be operated by hand. However, and referring to FIG. 3, the torque controlling ring 54 is then moved co-axially downwarldy into the groove 46 and the leg 59 is cammed radially inwardly by the lip or protrusions 62. When the torque controlling ring 54 is all the way in position as shown in FIG. 4, the leg 59 snaps back into its relaxed position with its lip or protrusions 62 within the undercut counter bore 52. This locks the ring 54 in position and it is deformed in the area indicated at A thus applying friction to the stem 28 to increase the torque to a predetermined amount.

The material used for the torque controlling ring 54 is any material whether natural or synthetic which is resilient and yieldable so that it can deform under the urging of the valve stem in a pressure relationship thereto resulting in a friction to produce a torque on the stem. Preferably the material is a plastic material which is semi-rigid, resilient and yieldable and having modulus at least as great as that of a low molecular weight, high pressure polyethylene. For example, a polyolefin such as polyethylene, polypropylene, polybutene and polypentene may be used. However, other conventional synthetic polymeric materials having a modulus, as defined, can be used such as polyurethane, plasticized polyvinylchloride or polyvinylidene chloride or combinations thereof, polyamides (e.g. conventional nylons) polyacetals, polyesters (Dacron, Orlon), polysiloxane and polysilicon rubbers, polysulfide rubbers and halogenated rubbers such as polychloroprene.

The terminology used throughout the specification is for the purpose of description and not limitation, the scope of the invention being defined in the claims.

What is claimed is:

1. A soft-seated rotary valve assembly comprising:
   a valve housing having a flow passage therethrough with an inlet and an outlet; said housing further including a chamber defining valve seat means intermediate the inlet and outlet of said flow passage and a bore having one end portion open to the exterior of the housing and another end portion open to said chamber, said bore at its opening to the exterior of the housing being provided with a first groove, said first groove having an outwardly facing first wall and a second wall co-axial of said bore, said co-axial wall being undercut at its inner end adjacent to said first wall to define a second groove;
   a valve structure including a valve stem extending through and rotatable in said bore and a valve member cooperating with said valve seat means and operatively carried on said valve stem and movable to open and close said flow passage;
   means to retain said valve stem against axial movement relative to said housing member;
   means spaced inwardly of the opening of said bore to the exterior of said housing for providing a seal between said stem and said bore; and
   means outwardly of said sealing means and between said valve stem and said bore for applying a controlled torque on said valve structure sufficient to render said structure inoperative by hand, said means also preventing ingress of fluid and/or abrasive material and preventing corrosion of said valve stem and said housing outwardly of said sealing means, said torque controlling means including an annular ring made of a semi-rigid resilient and yieldable material and having inner and outer peripheral walls and top and bottom radial walls, said annular ring being positioned in said first groove and having a radially extending lip means on its lower end which is received in said second groove to prevent axial movement thereof, said ring having a radial thickness along at least one radius thereof slightly greater than the radial thickness between said co-axial wall of said first groove and said valve stem whereby said ring is deformed when in position to thereby provide a friction produced controlled torque on said stem, and said annular ring further having an annular groove in one of its walls defining a pair of spaced legs, at least one of which is capable of flexing when said ring is being inserted into said first groove between said co-axial wall and said valve stem and which snaps back when said lip means is received in said second groove.

2. A rotary valve assembly as claimed in claim 1 wherein said annular groove in said ring extends from said bottom wall toward said top wall and is coaxial of said inner and outer peripheral walls.

3. A rotary valve assembly as claimed in claim 2 in which said inner peripheral wall is defined by at least two wall sections, at least one said wall section diverging from an intermediate point on the same away from the ring axis.

4. A rotary valve assembly as claimed in claim 3 in which said lip means of said annular ring has a frustoconical portion to provide a cam surface for camming one leg radially inwardly when said ring is installed.

5. A rotary valve assembly as claimed in claim 4 in which said annular ring is made from a plastic material or rubber.

6. A rotary valve assembly as claimed in claim 5 in which said plastic material is polypropylene.

7. A rotary valve assembly as claimed in claim 5 in which said plastic material is a polyamide.

8. A rotary valve assembly as claimed in claim 5 in which said plastic material is nylon.

* * * * *

UNITED STATES PATENT OFFICE
CERTIFICATE OF CORRECTION

Patent No. 3,814,379          Dated June 4, 1974

Inventor(s) Frank C. Hackman

It is certified that error appears in the above-identified patent and that said Letters Patent are hereby corrected as shown below:

The term of this patent subsequent to March 26, 1991, has been disclaimed.

Signed and sealed this 13th day of May 1975.

(SEAL)
Attest:

RUTH C. MASON
Attesting Officer

C. MARSHALL DANN
Commissioner of Patents
and Trademarks